(12) United States Patent
Biedermann et al.

(10) Patent No.: US 9,086,429 B1
(45) Date of Patent: Jul. 21, 2015

(54) HIGH DATA RATE ATOM INTERFEROMETRIC DEVICE

(71) Applicant: Sandia Corporation, Albuquerque, NM (US)

(72) Inventors: Grant Biedermann, Albuquerque, NM (US); Hayden James Evans McGuinness, Albuquerque, NM (US); Akash Rakholia, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 14/643,970

(22) Filed: Mar. 10, 2015

Related U.S. Application Data

(63) Continuation-in-part of application No. 14/289,038, filed on May 28, 2014, now abandoned.

(60) Provisional application No. 61/828,589, filed on May 29, 2013.

(51) Int. Cl.
*G01C 19/58* (2006.01)
*G01C 21/16* (2006.01)
*G01P 15/093* (2006.01)

(52) U.S. Cl.
CPC .............. *G01P 15/093* (2013.01); *G01C 19/58* (2013.01)

(58) Field of Classification Search
CPC ........ G01C 19/58; G01C 21/16; G01N 21/00; G01N 21/64; G01P 15/18; G01P 21/00; G01R 33/022; G01R 33/1284; G01R 33/26

USPC ............ 250/251; 324/244, 301, 304; 356/72, 356/460; 702/104, 141, 194, 196, 28, 96
See application file for complete search history.

(56) References Cited

U.S. PATENT DOCUMENTS

| | | | |
|---|---|---|---|
| 6,476,383 B1* | 11/2002 | Esslinger et al. | 250/251 |
| 6,675,106 B1* | 1/2004 | Keenan et al. | 702/28 |
| 8,212,556 B1* | 7/2012 | Schwindt et al. | 324/304 |
| 8,405,021 B2* | 3/2013 | Anderson et al. | 250/251 |
| 8,710,428 B1* | 4/2014 | Loftus et al. | 250/251 |
| 8,941,053 B1* | 1/2015 | Biedermann et al. | 250/251 |

(Continued)

OTHER PUBLICATIONS

Canuel, B., et al. "Six-Axis Inertial Sensor Using Cold-Atom Interferometry", Physical Review Letters 97, 010402, (2006).

(Continued)

*Primary Examiner* — David A Vanore
(74) *Attorney, Agent, or Firm* — Martin I. Finston

(57) ABSTRACT

A light-pulse atomic interferometry (LPAI) apparatus is provided. The LPAI apparatus comprises a vessel, two sets of magnetic coils configured to magnetically confine an atomic vapor in two respective magneto-optical traps (MOTs) within the vessel when activated, and an optical system configured to irradiate the atomic vapor within the vessel with laser radiation that, when suitably tuned, can launch atoms previously confined in each of the MOTs toward the other MOT. In embodiments, the magnetic coils are configured to produce a magnetic field that is non-zero at the midpoint between the traps. In embodiments, the time-of-flight of the launched atoms from one MOT to the other is 12 ms or less. In embodiments, the MOTs are situated approximately 36 mm apart. In embodiments, the apparatus is configured to activate the magnetic coils according to a particular temporal magnetic field gradient profile.

22 Claims, 9 Drawing Sheets

(56) References Cited

U.S. PATENT DOCUMENTS

| | | | | |
|---|---|---|---|---|
| 2009/0272887 | A1* | 11/2009 | Fatemi et al. | 250/251 |
| 2009/0289629 | A1* | 11/2009 | Tuchman | 324/304 |
| 2011/0101972 | A1* | 5/2011 | Narducci et al. | 324/244 |
| 2013/0168541 | A1* | 7/2013 | Stoner et al. | 250/251 |
| 2014/0016118 | A1* | 1/2014 | Compton et al. | 356/72 |
| 2014/0190254 | A1* | 7/2014 | Bouyer et al. | 73/382 G |

OTHER PUBLICATIONS

Greiner, M., et al. "Magnetic transport of trapped cold atoms over a large distance", Physical Review A. 63, 031401 (2001).
Gustavson, T.L., et al. "Transport of Bose-Einstein condensates with optical tweezers", Physical Review Letters, 88, 2 020401 (2002).
McGuinness, H.J., et al. "High data-rate atom interferometer for measuring acceleration", Applied Physics Letters 100, 011106 (2012).
Muller, T., et al. "A compact dual atom interferometer gyroscope based on laser-cooled rubidium", European Physical Journal D, vol. 53, p. 273 (2009).
Schoser, J., et al. "Intense source of cold Rb atoms from a pure two-dimensional magneto-optical trap", Physical Review A 66, 023410 (2002).
Small Business Innovation Research, "SBIR awards for AOSense", Retrieved Aug. 4, 2011, from https://sba-sbir-qa.reisys.com/sbirsearch/detail/91181.
Small Business Innovation Research, "SBIR awards for ColdQuanta", Retrieved Aug. 4, 2011, from http://sba-sbir-qa.reisys.com/sbirsearch/detail/128757.
Small Business Innovation Research, "SBIR awards for Vescent", from https://sbir.gov/sbirsearch/detail/345209.
Twinleaf, Inc., "Atomic spin gyroscope", Retrieved May 24, 2012, from http://www.twinleaf.com/gyroscope/.

* cited by examiner

HIGH DATA RATE ATOM INTERFEROMETRIC DEVICE

CROSS-REFERENCE TO RELATED APPLICATIONS

This application is a continuation-in-part of the commonly owned U.S. patent application Ser. No. 14/289,038 filed on May 28, 2014, the entirety of which is hereby incorporated herein by reference.

The abovesaid U.S. patent application Ser. No. 14/289,038 claims priority to U.S. Provisional Patent Application No. 61/828,589, filed on May 29, 2013, and entitled "LIGHT-PULSE ATOM INTERFEROMETRIC DEVICE," the entirety of which is incorporated herein by reference.

STATEMENT OF GOVERNMENT INTEREST

This invention was developed under Contract DE-AC04-94AL85000 between Sandia Corporation and the U.S. Department of Energy. The U.S. Government has certain rights in this invention.

TECHNICAL FIELD

This invention relates to atomic interferometry and more particularly to light-pulse atom interferometers and their uses in gyroscopes and accelerometers.

ART BACKGROUND

Atomic interferometry is a known technique with applications in gyroscopes and accelerometers, as well as in other instruments for sensing and metrology. According to known principles of light-pulse atomic interferometry (LPAI), selected atoms are placed in a coherent superposition of different internal states, which oscillate as each atom simultaneously traverses two possible paths between common initial and final points in phase space. At the final point, the two paths interfere. Phase differences between the two paths induced by acceleration or rotation are manifested as shifts in the relative populations of the different internal atomic states, as revealed by a state-selective detector such as a fluorescence or laser-absorption detector.

More specifically, a stimulated Raman transition entangles momentum states (which are external) with spin states (which are internal) so that the atoms in the respective arms of the interferometer are in different momentum-spin states. The first pulse of a so-called "$\pi/2$-$\pi$-$\pi/2$" sequence of optical pulses splits the atomic phase trajectories into the two interferometric "arms" by exciting some atoms from a lower to a higher hyperfine level of the atomic ground state by means of a Raman transition in which photonic recoil induces a corresponding momentum state. (The laser that induces the Raman transition is detuned by a small increment matched to a designated Doppler shift, so as to select for a particular narrow range of initial momenta.) The second pulse exchanges the internal states relative to the external states (or vice versa) so that the two arms will converge. Depending on its phase, the third pulse places the atom in the upper or lower hyperfine state for subsequent detection. Sensing of acceleration or rotation is possible because these conditions cause different phase shifts in the different arms of the interferometer.

It should be understood that the preceding discussion is directed to atomic Raman transitions for purposes of illustration only, and not by way of limitation. Raman-active molecules that exhibit appropriate transitions may also be useful in this context, and are not excluded from the scope of the present invention. Accordingly, references to an atomic vapor or a warm atomic vapor should be understood to include molecular vapors.

As the term is used herein, any atomic or molecular species is "Raman-active" if it exhibits at least one stimulated Raman transition.

As will be seen below, an exemplary embodiment of the present invention employs rubidium vapor as the Raman-active atomic species. It should be understood, however, that any of various atomic (and possibly molecular) species may be used, provided only that they provide suitable optical transitions.

FIG. 1 provides an atomic energy-level diagram of rubidium, illustrating among other things a hyperfine splitting F=1, F=2 of the atomic ground state of rubidium. The cooling beam along with the repump beam (respective frequencies $\nu_{cool}$ and $\nu_{repump}$, as indicated in the figure) are used to recapture, launch and cool the atoms. The optical pumping pulse (frequency $\nu_{pump}$, as indicated in the figure) along with the repump beam (frequency $\nu_{repump}$) are used to initially populate the F=2, $m_F$=0 state. The F=1 state is then populated by the first $\pi/2$ pulse via a Raman transition stimulated by the Raman pulse (frequencies $\nu_1$ and $\nu_2$ as indicated in the figure), which counterpropagate through the vacuum cell. The probe pulse (frequency $\nu_{detect}$, as indicated in the figure) along with the repump pulse (frequency $V_{repump}$) is used to detect the post-interferometer population of atoms in the F=2 and F=1 states via fluorescent emission. The frequency offset $\delta$ is the detuning of the Raman pulse to accommodate Doppler shift of the desired velocity class. The frequency offset $\Delta$ is an intentional detuning that controls the frequency of oscillation of the superposed atomic state and mitigates the effect of spontaneous emission.

Until recently, atom interferometer accelerometers have operated at data rates at or below a few Hertz, which is too slow to be useful for application such as navigation on dynamic platforms. Accordingly, there remains a need for atom interferometers that can provide data rates great enough for applications in navigation.

SUMMARY OF THE INVENTION

We have developed an LPAI device that can function at data rates of up to hundreds of Hertz with sensitivities acceptable for some navigation applications. In implementations, our device can simultaneously measure both acceleration and rotation at a navigation-grade data rate (on the order of 100 Hz) with high sensitivity, and it also has the potential to exhibit high bias stability. A high data rate also allows for the miniaturization of the LPAI device due to reduction of the volume in which the atoms undergo free-fall.

The operation of our device relies on launching two cold-atom clouds toward one another and re-trapping nearly all atoms in each cloud after interrogation and detection. After re-trapping, the atoms are launched again to take part in another interferometric measurement. This method allows the cycle "dead time", i.e., time that does not relate to atom interrogation, to be drastically reduced and the rate of operation to be drastically increased from several Hertz to hundreds of Hertz. The same method also permits the system to be reduced in size, which makes LPAI a more viable technology for applications in dynamic environments. The miniaturization of the supporting equipment, laser systems, vacuum cells, optics, etc., is largely a problem of engineering, and does not fundamentally limit the capability of the device.

Accordingly, a light-pulse atomic interferometry (LPAI) apparatus is provided, comprising a vessel, two sets of magnetic coils configured to magnetically confine an atomic vapor in two respective magneto-optical traps (MOTs) within the vessel when activated, and an optical system configured to irradiate the atomic vapor within the vessel with laser radiation that, when suitably tuned, can launch atoms previously confined in each of the MOTs toward the other MOT.

In embodiments, there is a midpoint between the two sets of magnetic coils, and the two sets of magnetic coils are configured such that when activated, the coils produce a magnetic field that is non-zero at the midpoint. In embodiments, the MOTs are separated from each other by a distance selected to provide a time-of-flight of the launched atoms from one MOT to the other of 12 ms or less.

In embodiments, the MOTs are situated approximately 36 mm apart.

In embodiments, the apparatus is configured to activate the magnetic coils according to a magnetic field gradient profile. In accordance with the profile, the magnetic field is switched off at a time t0 and switched back on at a time t3 to produce an initial high value of a gradient of the magnetic field. Still in accordance with the profile, the magnetic field gradient is ramped down from its initial high level at the time t3 to a lower steady-state level at a subsequent time t4, while from t3 to t4, atoms released from one MOT are being recaptured by the other MOT.

DESCRIPTION OF AN EXEMPLARY EMBODIMENT OF THE INVENTION

We have developed a light-pulse atom interferometer (LPAI) that utilizes stimulated Raman transitions to carry out an interferometer sequence for two separate clouds of roughly $10^7$ Rubidium-87 atoms each. Without limitation, we will describe, below, such an interferometer as an exemplary embodiment of our invention.

Figure 1:
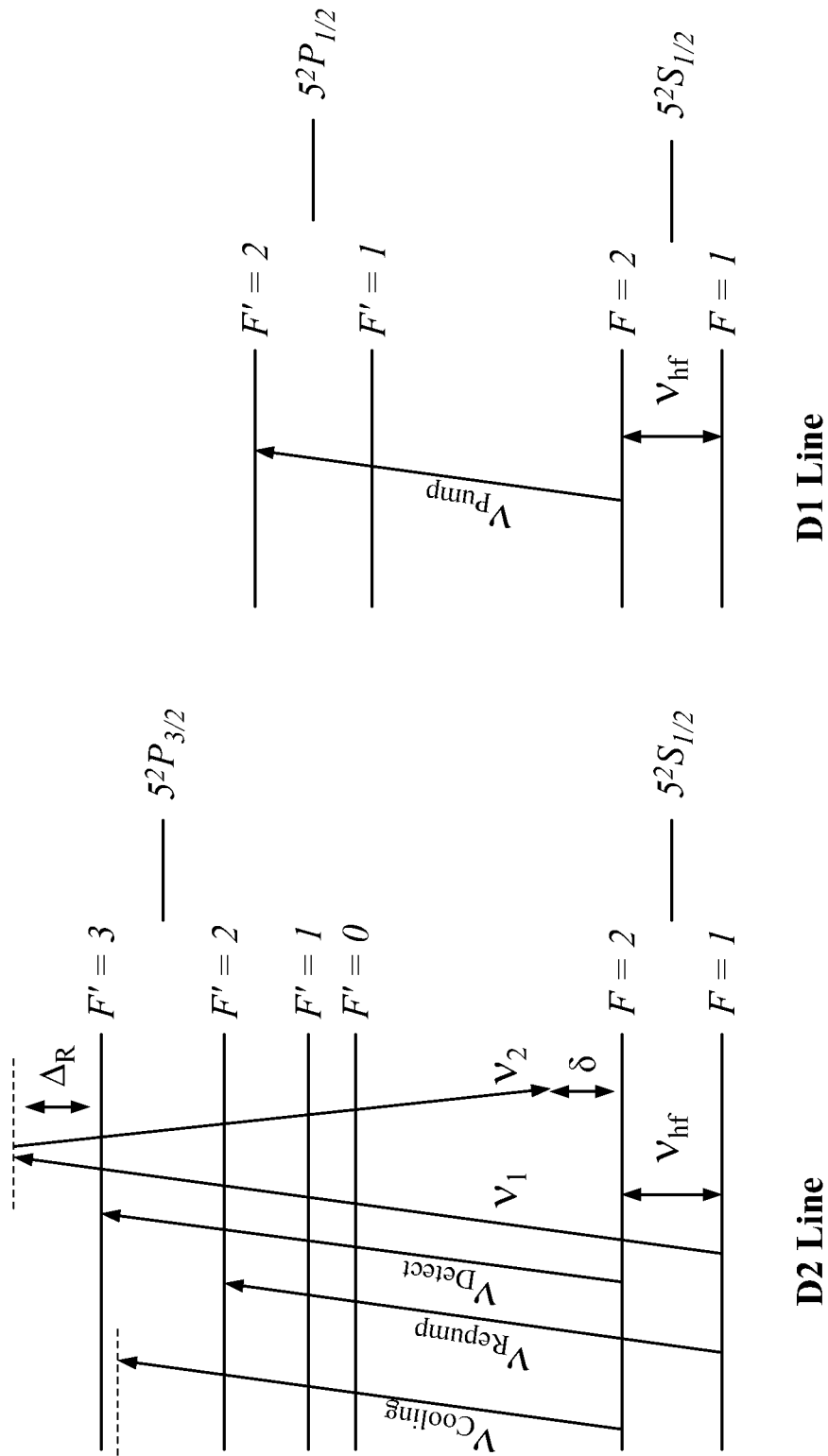
FIG. 1 provides an atomic energy-level diagram of rubidium 87 and the laser frequencies used by the apparatus. The laser frequencies are represented by the following: $v_{cooling}$ is the MOT cooling, $v_{Repump}$ is the repumper, $v_{Detect}$ is the detection, $v_{pump}$ is the optical pumper, and $v_1$ and $v_2$ are the two Raman beam frequencies. The symbol $\Delta_R$ corresponds to the Raman beam detuning from the F'=3 resonance and $\delta$ is the differential Raman beam detuning from the hyperfine splitting $v_{hf}$.
Figure 2:
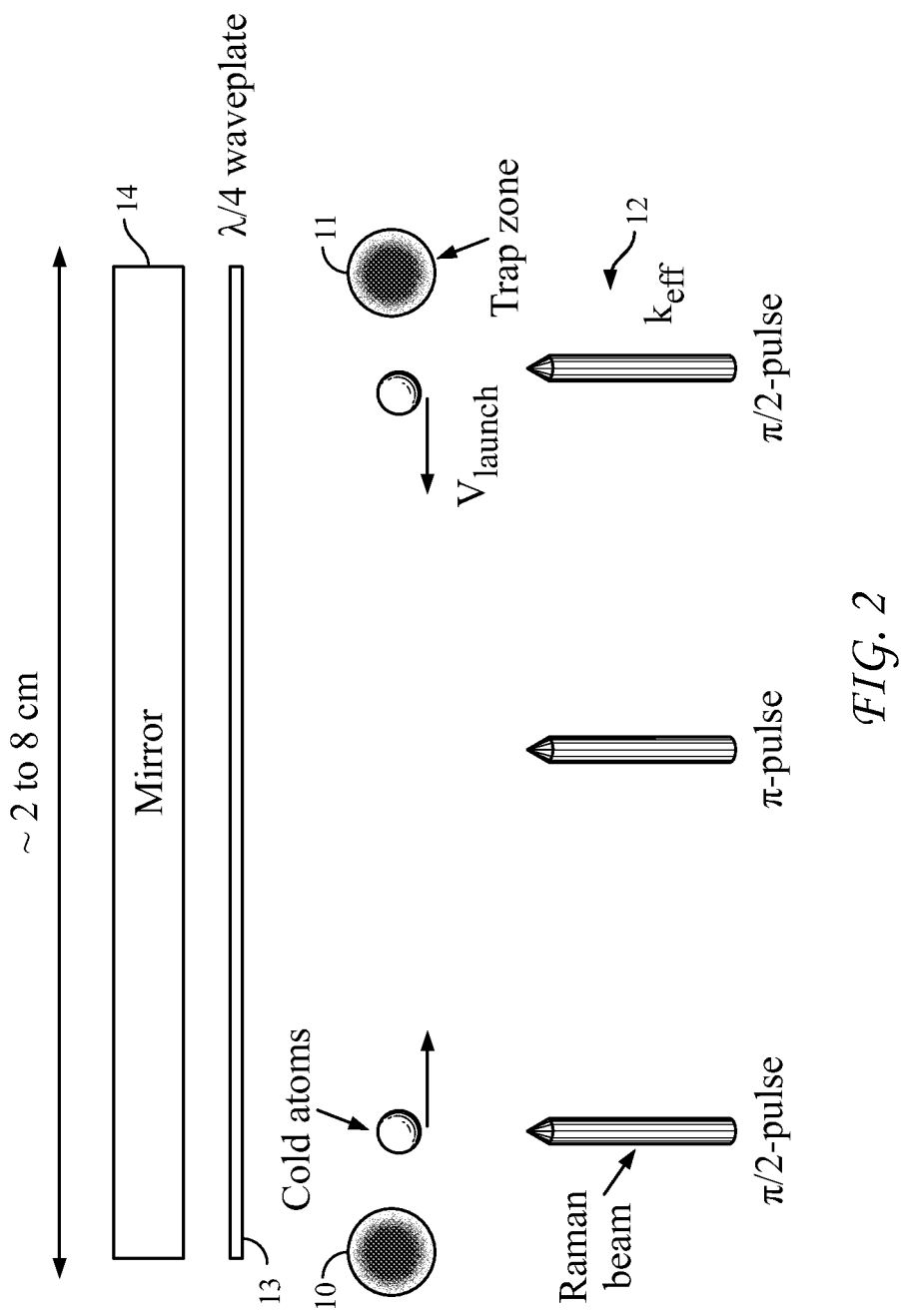
FIG. 2 schematically provides a functional configuration for a short time-of-flight, two-axis atomic interferometric sensor. The figure is provided as a pedagogical aide for understanding the present invention.

The operation of an illustrative interferometer will now briefly described with reference to FIG. 2. Initially, two clouds of atoms are trapped through the use of two spatially separated Magneto-Optical Traps (MOTs) 10, 11 and are cooled (typically by optical cooling without cryogenics) to temperatures on the order of several hundred microkelvin using such techniques as optical molasses cooling.

Next, the trapping magnetic fields are turned off and the atom clouds are launched at each other through the use of atomic fountain techniques and appropriate MOT beam geometries. Concurrently, polarization-gradient cooling is used to reduce the temperature of the atom clouds to about 20 microkelvin. After launch and sub-Doppler cooling, all constraining forces on the clouds are discontinued and the clouds are allowed to propagate in free fall.

A sequence 12 of Raman light pulses, commonly referred to as a "π/2-π-π/2" pulse sequence, is then impinged on the atom clouds in flight. These pulses each comprise two colors for each of the two clouds and are pulsed three times each. This has the effect of splitting the matter-waves of the atoms in the cloud along two separate spatial paths and then recombining them to create interference. This interference is manifested in the probability distribution among two internal states corresponding respectively to the upper and lower ground states of the atom's valence electron. After the last pulse, the fraction of the atoms that are in the upper state is separately detected through light-induced fluorescence.

A quarter-wave plate 13 and mirror 14 constitute a retroreflective element for the Raman beams in accordance with known methods of atomic interferometry.

It should be noted that the trapping laser beams (also referred to herein as "cooling" beams) cool the trapped atoms, and that the detuning of these beams effectuates the launch. In our implementation, eight of twelve trapping beams are used for the launch. Those eight beams are coplanar, and for each trap the beams are oriented at +45, +135, −45, and −135 degrees from the launch direction. Cooling lasers are normally tuned to cool "toward zero velocity" via an optical Doppler interaction. However, for the launch the optical cooling interaction is tuned to cool toward a desired non-zero velocity.

The above-described sequence takes place for each of the two atom-clouds. The fraction P of atoms that are in the upper state can be related to the acceleration and rotation the atoms experienced during the total interrogation time, i.e. the amount of time T the atoms were unconstrained, according to the expression $P=(\frac{1}{2})(1-\cos\Delta\phi)$, wherein $\Delta\phi = \vec{k}\cdot(\vec{a}-2(\vec{v}\times\vec{\Omega}))T^2$, $\vec{k}$ is the effective wavevector of the pulsed Raman light, $\vec{a}$ is the acceleration, $\vec{v}$ is the launch velocity of the atoms, and $\vec{\Omega}$ is rotation.

The Raman beam is offset by 10 degrees from the perpendicular of the launch vector. The projection of the launch velocity onto the Raman beam axis results in a Doppler shift for each respective interferometer, each shift opposite in sign from the other. This allows us to direct and reflect both colors of the Raman beam onto the atomic ensembles, but perform a Doppler-sensitive Raman transition for both. Furthermore, this allows for use of a single optical fiber to provide both Raman frequencies, thus rejecting common-phase noise from the fiber path length.

The measureable effect of acceleration can be decoupled from the measureable effect of rotation. That is, subtracting the two detection signals will cancel out the signal due to rotation, leaving an acceleration signal. Similarly, adding the two detection signals will cancel out the signal due to acceleration, leaving a rotation signal.

Each of the two atom-clouds generates a respective interferometer. The detection signals are the calculated phases for the respective interferometers.

After each cloud has been detected, the trapping laser beams and magnetic fields are turned back on. The geometry and launch velocity of the clouds is such that each cloud is very near the opposing MOT trap zone. A large percentage of each atom cloud is "re-trapped" in these trapping zones. Essentially, the atom clouds have exchanged initial positions. After cooling and a small addition of atoms through the trapping of background atoms, the interferometric cycle is ready to begin again.

By repeating this experiment many times, a time record of the atoms' acceleration or rotation can be measured. This record, in the case of a dynamic system in which the acceleration and rotation are constantly changing, can be used for, e.g., navigation. For static systems, it can be used to very precisely measure local accelerations or rotations, such as the local value of gravity or minute seismic activity.

An LPAI system is ultimately limited by atomic shot noise. That noise limit corresponds to a signal-to-noise ratio of $\sqrt{N}$, where N is the number of participating atoms. Accordingly, the larger the number of atoms that participate in the LPAI, the greater the sensitivity. For our current system at a data rate of 100 Hz with $N=10^7$, a sensitivity of order 10 nano-g/$\sqrt{Hz}$ for acceleration and 10 nano-rad/s/$\sqrt{Hz}$ for rotation is theoretically possible. (The symbol "g" in this context represents the standard value of the acceleration due to gravity.) We have experimentally demonstrated measurements of acceleration and rotation at a navigation-grade data rate (on the order of 100 Hz) with sensitivities on the order of $\mu g/\sqrt{Hz}$ for acceleration and $\mu rad/s/\sqrt{Hz}$ for rotation.

Because the axes of the measured acceleration and rotation differ, the sensor preferably takes measurements along two non-parallel axes. An orthogonal geometric combination of three such sensors would have detection capability for all six degree of freedom.

It is noteworthy that although most known LPAI systems, even those aimed at mobile inertial navigation applications, have sensor head volumes on the order of thousands of cubic centimeters, our system's sensor head volume can be as low as a few hundred cubic centimeters while delivering comparable performance.

One important factor that enables our system to exhibit a high data rate and high sensitivity is the process of efficiently swapping the two atom clouds between the two trapping zones after each interferometric cycle. This significantly decreases the time needed to attain a sufficient atomic population.

Figure 3:
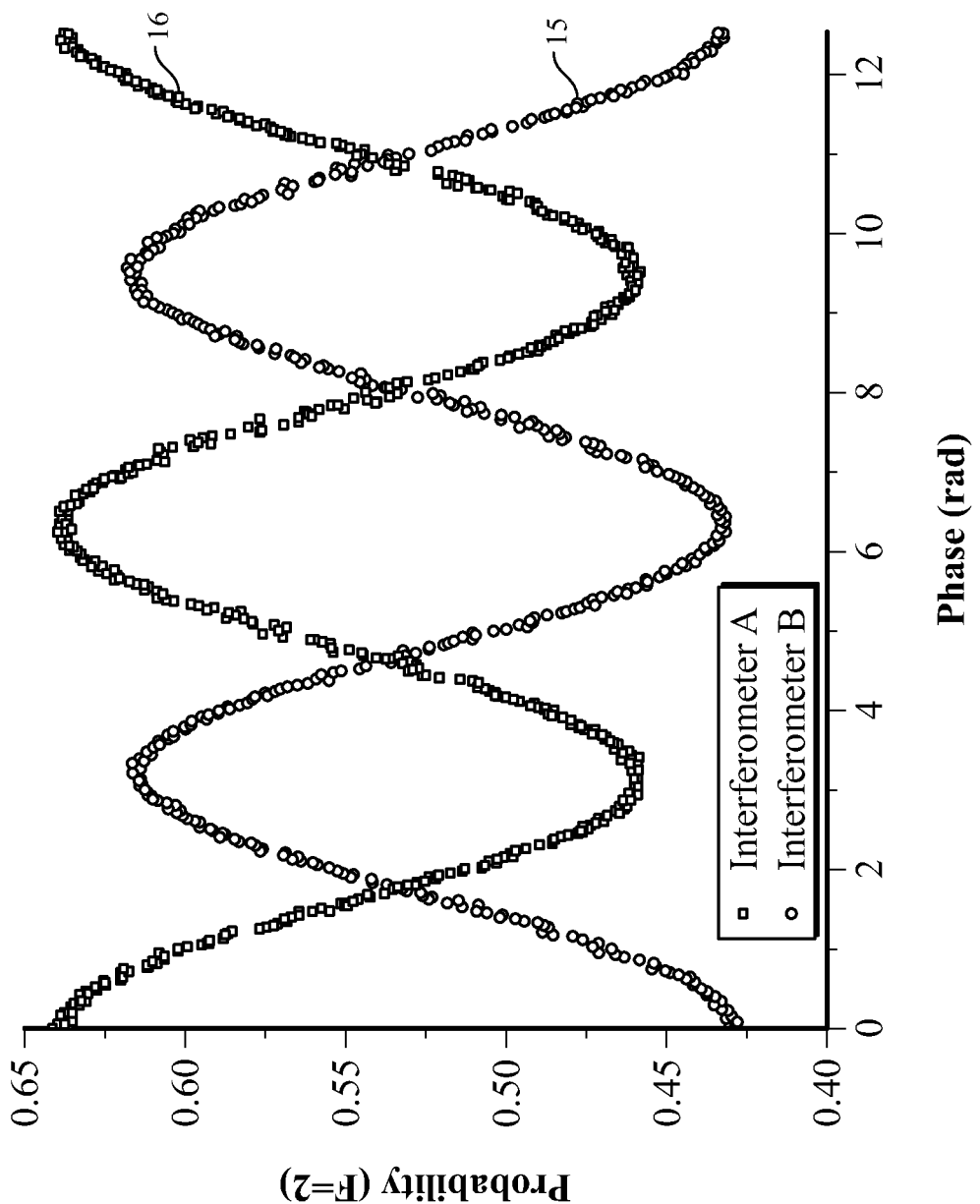
FIG. 3 is a phase scan for two interferometer clouds, showing the sinusoidal variation in the excited state probability as a function of relative Raman beam phase.

FIG. 3 provides an experimentally obtained interferometric phase scan for each of two interferometer clouds. The scans were taken concurrently from the same experiment as the result of an interferometric cycle from launch to re-trapping at an operating rate of 50 Hz. The figure shows the sinusoidal variation in the excited state probability as a function of relative Raman beam phase. A single fringe corresponds to a rotation of 8.8 mrad/s and an acceleration of $7.2\times10^{-3}$ g. Here, g is 9.81 m/s$^2$, i.e., the value commonly taken for the acceleration due to gravity. The lower trace 15 is also labeled "Interferometer B" in the figure, and the upper trace 16 is also labeled "Interferometer A".

The optical arrangement of the interferometer apparatus will now be described with reference to FIGS. 4, 5, 6, and 7. Common elements among the figures are indicated by like reference numerals.

Figure 4:
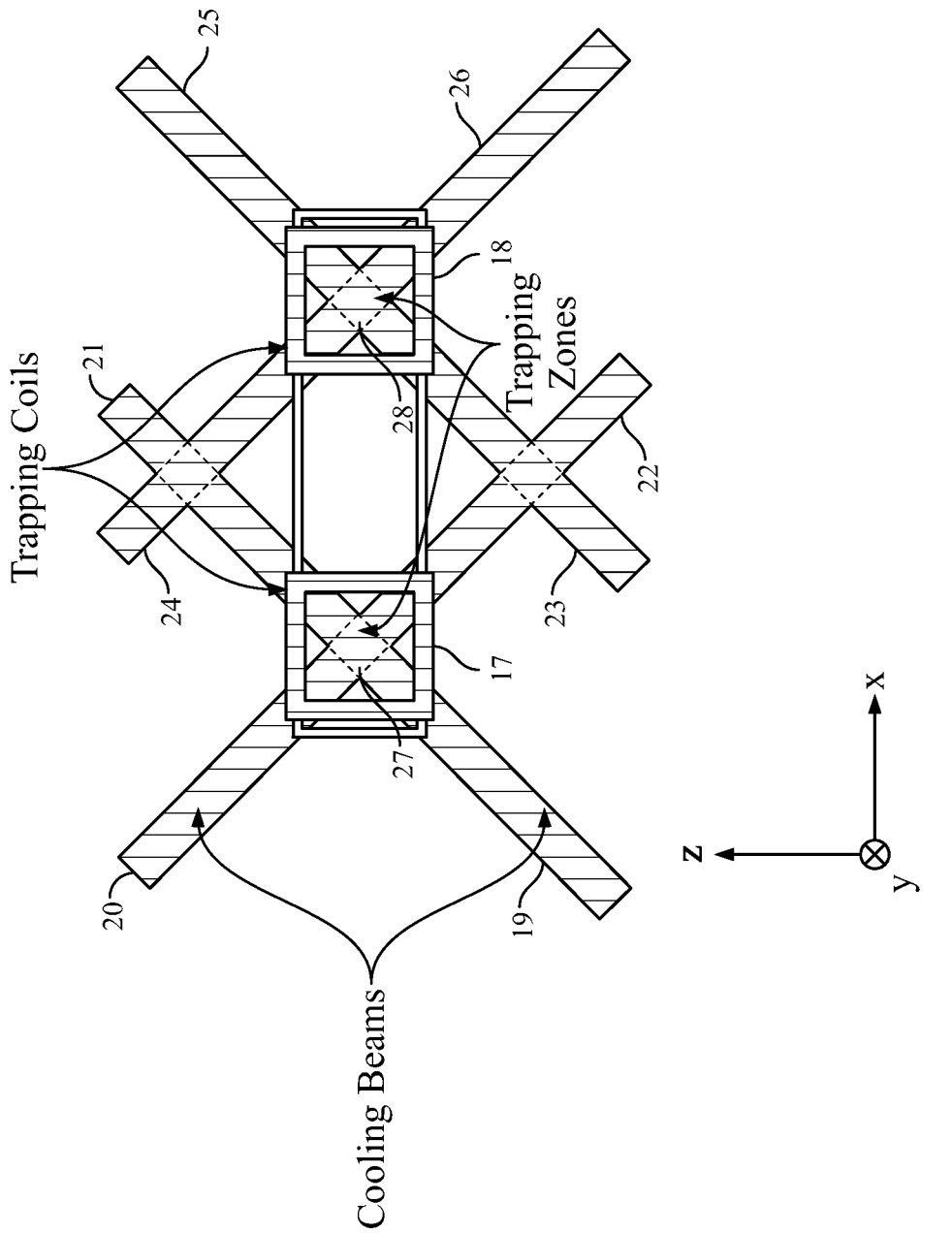
FIGS. 4 and 5 provide a schematic front elevational view, at different levels of detail, of an illustrative interferometer device according to an embodiment of the present invention.

FIG. 4 provides a simplified, schematic, elevational view of the interferometer apparatus from the front. According to our choice of coordinate system, this view is taken in the positive direction along the y-axis. The figure includes quadrupole coil sets 17 and 18 for creating the trapping magnetic fields, cooling (and launch) laser beams 19-26, and the trapping zones 27 and 28. As noted above, manipulation of the frequencies of the cooling beams creates the conditions for the clouds to be launched toward each other. A typical separation between the magneto-optical traps (MOTs) 27 and 28 is 36 mm, which we have found to be optimal in our design.

Laser beams 19-26 constitute eight of the twelve cooling beams, six of which are directed onto each trap. The remaining four beams, not shown in the figure but described in more detail below, are directed in the positive or negative direction along the y-axis.

Figure 5:
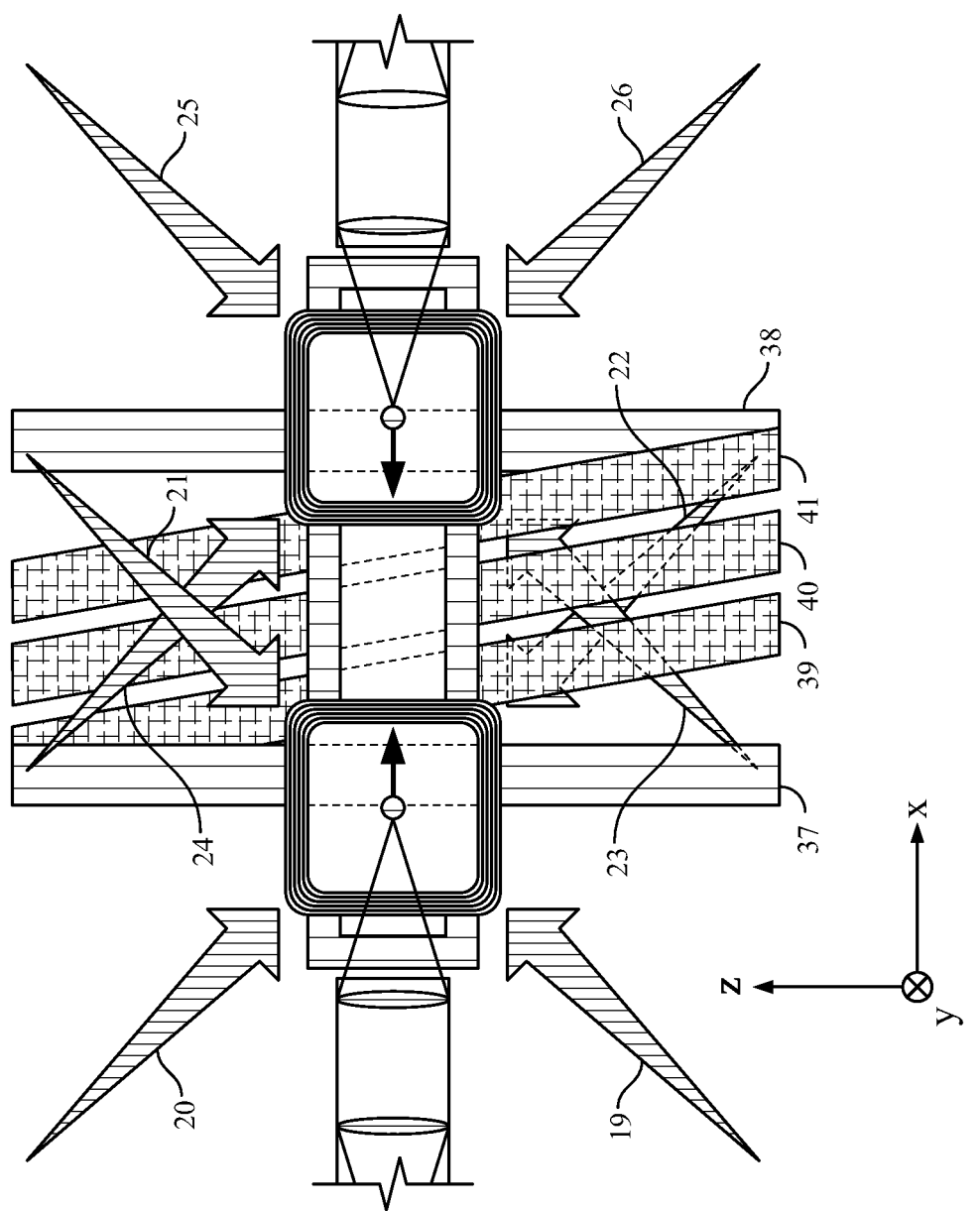

FIG. 5 provides a similar view to FIG. 4, with several further details added. Three types of optical beams are shown in the figure. As in FIG. 4, eight of the twelve cooling beams are visible in the figure. Those eight cooling beams are represented as respective groups of four converging beams 19-22 and 23-26, wherein each group of four beams forms a cross. All eight of the illustrated cooling beams are coplanar and are arranged in four collinear pairs.

Two probe beams 37 and 38 are shown as vertical bars near the center of the figure.

Three Raman pumping beams 39, 40, and 41 are seen extending diagonally near the center of the figure.

The outer cooling beams 19, 20, 25, 26 and the inner cooling beams 21-24 are respectively "blue detuned", i.e. detuned toward shorter wavelength, and "red detuned", i.e. detuned toward longer wavelength. The amount of detuning is typically a few megahertz. The detuning effectuates the launch of the trapped atomic populations toward each other. The launch leads to an exchange of at least a portion of each trapped population, so that loading of each trap is facilitated by the (at least) partial capture of the population launched from the other trap.

Figure 6:
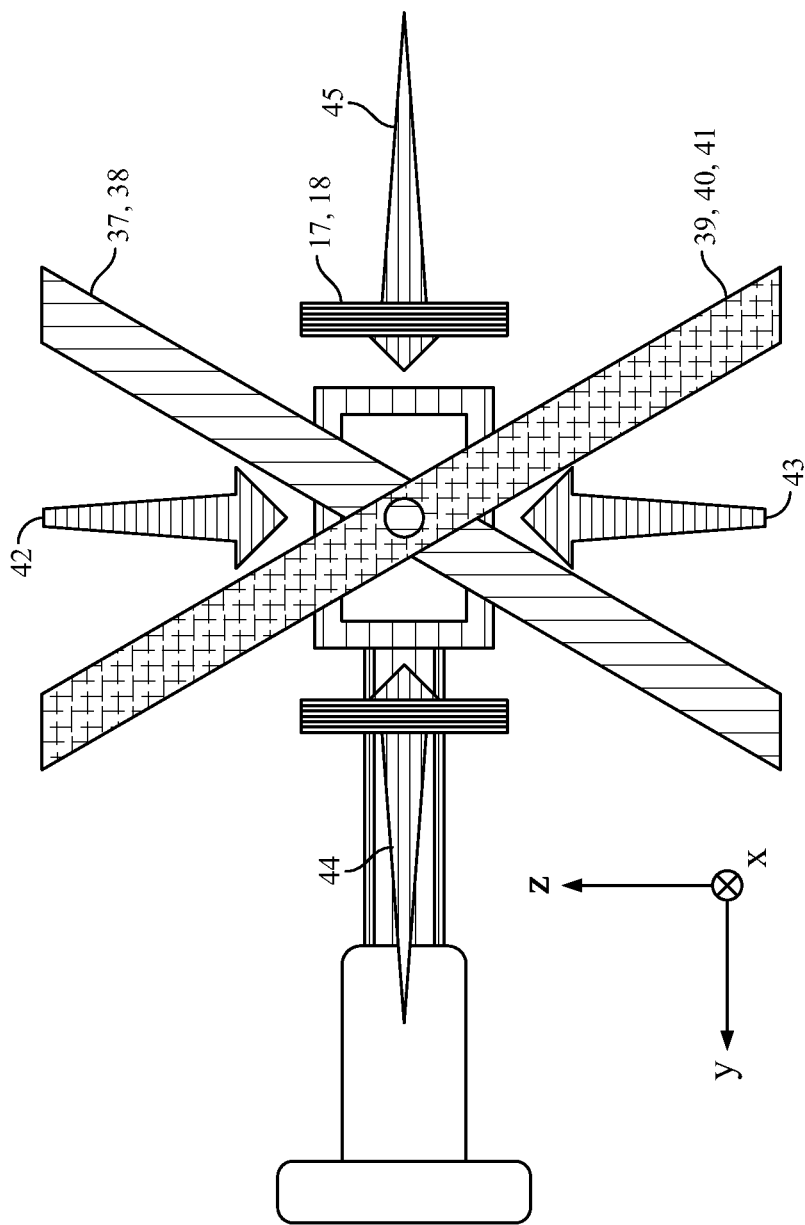
FIG. 6 is a schematic side elevational view of the illustrative device of FIGS. 4 and 5.

FIG. 6 provides a schematic side elevational view of the same device. The view of FIG. 6 is taken, according to the coordinate system that we have adopted, in the positive direction along the x-axis. Stated differently, the line of sight of the viewer in FIG. 6 is directed toward the device from the left side of FIG. 5.

The vertical arrows 42 and 43 in FIG. 6 represent the eight cooling beams 19-26 best seen in FIG. 5. The horizontal arrows 44 and 45 represent the remaining four cooling beams 19-26, shown in FIGS. 4 and 5. These four cooling beams include one collinear, oppositely directed pair of beams for each trap.

On comparison of FIGS. 5 and 6, it will be evident that the exemplary design allows for four planes of optical access, i.e. two planes for the cooling beams, one plane for the probe beams, and one plane for the Raman pumping beams.

Figure 7:
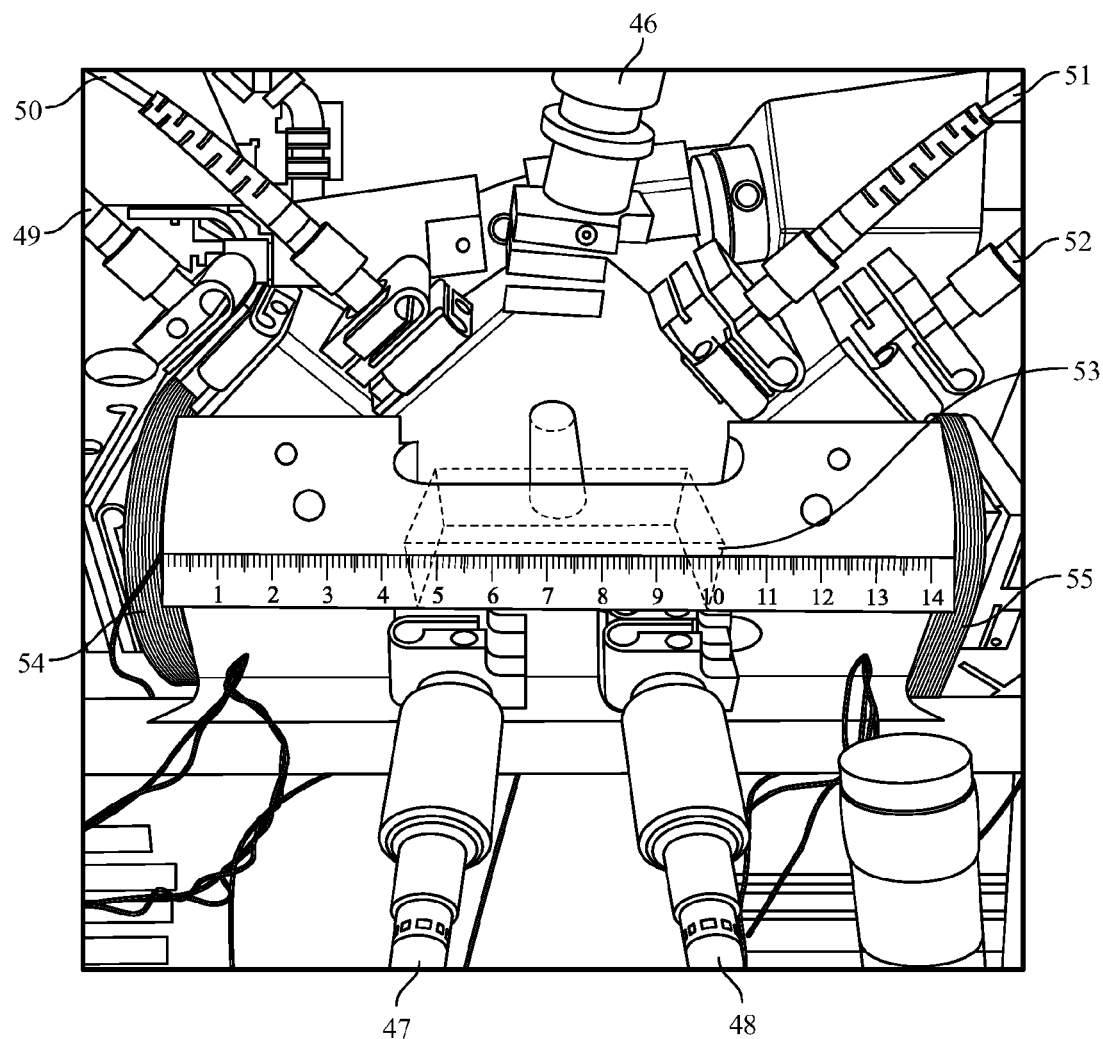
FIG. 7 is a perspective view of an experimental arrangement according to an embodiment of the present invention.

FIG. 7 provides a perspective view of our experimental device with the detection module removed. A dotted outline 53 indicates the position of the vacuum cell.

Leads for seven optical beams are visible in FIG. 7. The lead 46 visible at top center is for a pumping beam. The two leads 47 and 48 seen at the bottom of the figure correspond to two of the y-directed beams of the figure, i.e. one for each trap. The four remaining leads 49-52 visible at the top of the figure correspond to respective ones of the cooling beams explicitly shown in FIG. 5.

Also visible in FIG. 7 are two magnet coils 54 and 55, one at each end of the device. These are coils for two of the bias magnets, which are used (in addition to the quadrupole magnets) for precise tailoring of the magnetic field. Such use of bias magnets is conventional and well-known in the art, and need not be discussed further.

Many known LPAI systems accrue atomic clouds by trapping atoms from the background vapor. Due to the high vacuum required for LPAI systems, however, this method is quite slow; indeed, it may require a time on the order of tens to hundreds of milliseconds. This interval is dead time in which the device is not executing an interferometer sequence. As a consequence, it places a strict limit on the possible data rate of the interferometer.

By contrast, our exchange-cloud method in steady state operation can collect a significant number of atoms in less than 2 milliseconds. Since the end-of-cycle atom clouds are still much denser and colder than the background vapor, a significant number of atoms can be re-trapped into the new clouds through this method.

Preliminary data show that approximately 90 percent of the cloud atoms are re-trapped in a steady state when operating at 50 Hz. When operating at 80 Hz, approximately 85 percent of the cloud atoms are re-trapped. This was achieved by using MOT cooling beams with a $1/e^2$ diameter of approximately 9 mm. With the use of larger MOT beams the re-trapping efficiency would be even higher.

In addition to higher data rate, atom re-trapping also allows for higher duty cycle operation and orientation insensitivity for short interrogation times. Since significantly less time is spent loading MOT atoms, the percentage of the total cycle duration that atoms are being interrogated is increased to a high value.

Orientation insensitivity derives from the symmetric design of the retrapping scheme. Nearly all LPAI accelerometers are designed with the assumption that the atom trajectory will always be in the same direction; the atom launch velocity and the gravity potential gradient have a fixed relationship. For example, usually the atoms are launched against gravity ("up") and rely on gravity to bring the atoms back down to the measurement zone.

Consequently, those systems cannot measure acceleration when the trajectory of the atoms in free flight is in the opposite direction, e.g. if the device is rotated between 90 and 270 degrees. In our retrapping scheme the atoms are launched toward and re-trapped in conjugate trap locations with a time of flight short enough to nullify the displacement effect from gravity. In this case, only the launch orientation with respect to the line connecting the traps is relevant. This means accelerations and rotations can be measured regardless of the atom trajectory direction with respect to gravity, making the device insensitive to orientation.

Figure 8:
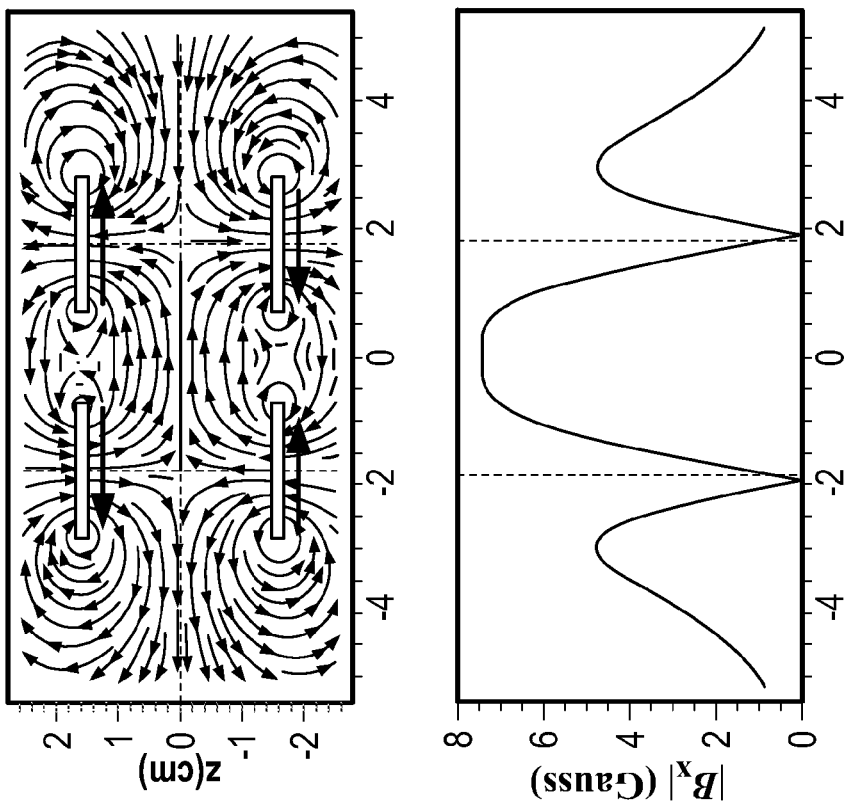
FIG. 8 compares a conventional configuration (left upper and lower views) of quadrupole magnetic coil sets with a preferred configuration according to the present invention (right upper and lower views).
Figure 8:
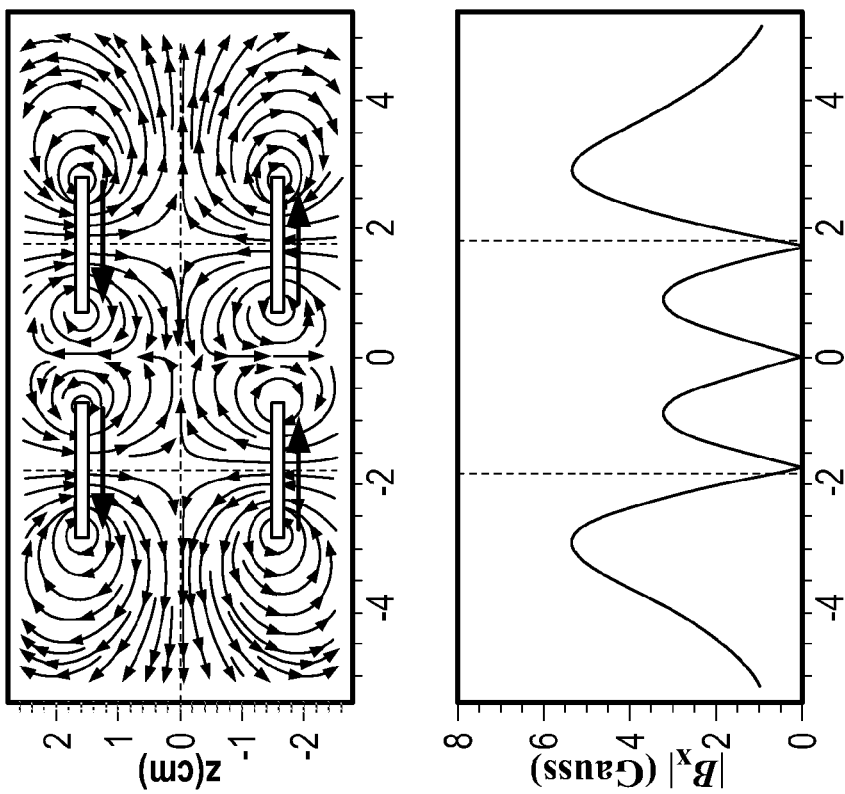

Two design features in particular allow our exchange-cloud method to function efficiently. One of these features is the arrangement of the magnetic field coils. FIG. 8 compares a conventional Helmholtz configuration (left upper and lower views) of quadrupole magnetic coil sets with our preferred anti-Helmholtz configuration (right upper and lower views). It will be seen that on the left, the quadrupole coil sets have the same polarity, as is apparent from the directions of the field lines shown in the upper view. This creates an additional magnetic field zero between the two traps, as seen in the trace of magnetic flux density in the lower view. By contrast, the quadrupole coil sets seen on the right have opposite polarity, and hence contain no additional magnetic field zeroes outside the trap zones along the atomic trajectory.

We recognized that if there is a magnetic zero between the two trapping zones, a cloud-like ensemble of atoms can form between the two coil sets during the atom trapping time of the interferometer cycle. The formation of such an atomic ensemble is undesirable because it can interfere with the functioning of the interferometer. Because in our geometry the coil-to-coil separation within each coil set is comparable to the separation between coil sets, we chose to eliminate the magnetic zero between the trapping zones by aligning the respective coil sets with opposite polarities.

We discovered a further advantage, in that the opposite-polarity configuration also increases the magnetic field gradient at the trap zones, relative to the co-polar configuration. This is advantageous because it tends to reduce the re-trapping time.

We discovered a still further advantage over the co-polar configuration, in that the opposite-polarity configuration extends the spatial reach of the magnetic field gradient farther toward the opposite trap zone. This is advantageous because it tends to increase the trap volume and thus the number of trapped atoms.

The second advantageous feature relates to the launching laser beam geometry. In conventional arrangements, a pair of launching laser beams are arranged to be exactly counter-propagating. However, such an arrangement would launch both clouds in the same direction. By contrast, our design requires the clouds to be launched with opposite velocities. To achieve that, we use four beams for each cloud. This produces a net force on each cloud that points toward the opposite trapping zone. In our configuration, as illustrated e.g. in FIGS. 4-6, no beams are co-propagating or counter-propagating with the atom cloud motion.

As noted above, a preferred separation between the two traps is 36 mm. This figure is the result of our efforts to optimize among several design tradeoffs. In particular, the time-of-flight of the launched atoms is in the approximate range 6-12 ms. (Acceleration takes approximately one millisecond.) The flight time was chosen to trade off sensitivity, which tends to increase with greater flight times, against the potential for error due to gravitational deflection of the atomic clouds, which increases with flight time. We also sought to minimize the overhead time, i.e. the portion of each cycle during which the atomic clouds are not in flight. Loading time, for example, was reduced while increasing the final loaded atomic population by tailoring the ramp-up of the field gradients for the quadrupole magnets. We will discuss that technique further below.

Accordingly, we believe that a 36-mm trap separation is close to optimal for minimizing cell dimensions while preserving performance, at least for environments in which maximum accelerations are on the order of one or at most a few g.

As is well known in the field of atomic interferometry, the mean free time between atomic collisions must be substantially less than the interrogation time, so that the atomic clouds remain coherent during the interrogation. To maintain coherence, conventional approaches to atomic interferometry typically use vapor pressures of a nanotorr or less. Because of our very short flight time, however, we are able to operate above one nanotorr, and can in fact operate successfully at vapor pressures of 100 nanotorr or even somewhat more. This is very significant not least because the equilibrium vapor pressure of rubidium at room temperature is about 100 nanotorr. This improves the possibility of using a permanently sealed vapor cell without the need for cooling. The helium permeability of present-day vapor cells, which eventually causes the helium concentration of the cell to rise to atmospheric levels, is a barrier to this currently, but the creation of cells with very low helium permeability is an active area of research and development in industry.

In operation, numerous parameters must be controlled according to specified time-dependent profiles. Many of those parameters are well-known in the art and need not be discussed here. However, we have discovered certain profiles that are of particular benefit. Those profiles are discussed here with reference to FIG. 9.

Figure 9:
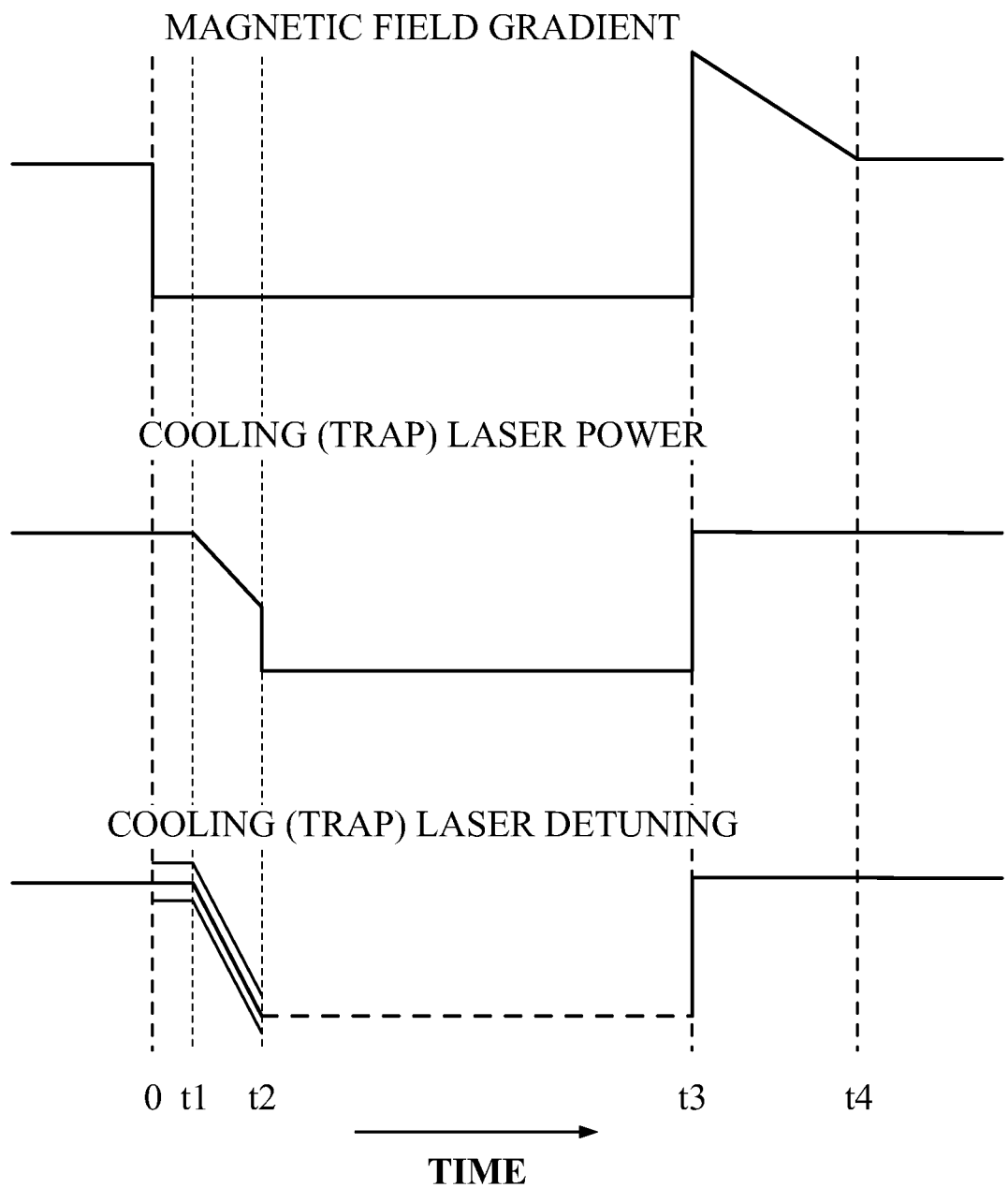
FIG. 9 is a timing diagram for three of the time-dependent operational parameters of an illustrative device according to the present invention.

The magnetic field gradient profile illustrated at the top of FIG. 9 has been found effective for filling the traps relatively rapidly, and for maximizing the final number of trapped atoms when the traps are filled. A high field gradient results in a loss of atoms in steady state due to excessive density, but it offers the smallest relaxation time into the trap. Thus, we start at a high field gradient to quickly recapture atoms, and ramp down as the atomic population and density increase. It will be seen in the figure that the field is switched off at t=0 and switched back on to produce an initial high value of the gradient at t3. From t3 to t4, the field is ramped down, for example on a linear trajectory, until the final value of the field gradient is reached. The time from t3 to t4 is the recapture time. It is typically about 3-4 ms in our device. The peak field gradient is exemplarily 24 Gauss per centimeter (G/cm), and the steady-state value is exemplarily 18 G/cm in the y-direction.

The middle curve of the figure provides a trajectory for the power of the cooling lasers. It will be seen that the lasers are already on, at the cooling frequency, prior to t=0. At t=0 the lasers are selectively blue and red detuned to generate the launch. At t1 the lasers are further red detuned and run at reduced power for sub-Doppler cooling until t2, at which point they are shut off. At t3, the lasers return to full power at the cooling frequency. The amount of time from 0 to t1 is about one millisecond, and the amount of time from t1 to t2 is likewise about one millisecond. The amount of time from t2 to t3 is typically about 6-12 ms.

A typical repeat rate for operating our device is 80 cycles per second.

In implementations, it will be desirable to automate the cycle repetitions and the control of the time-varying operational parameters. In particular, such implementations will advantageously include control modules for automatically controlling the cooling laser power and detuning, and for automatically controlling the quadrupole field gradient, in accordance with profiles such as those of FIG. 9.

Those skilled in the art will appreciate that effects such as eddy currents that can increase the switching time of the device are desirably reduced. For that purpose, we fabricated the frame of our device from fiberglass circuit board material which, because it is a low-conductivity material, helps to suppress eddy currents.

What is claimed is:

1. Light-pulse atomic interferometry (LPAI) apparatus, comprising a vessel, two sets of magnetic coils configured to magnetically confine an atomic vapor in two respective magneto-optical traps (MOTs) within the vessel when activated, and an optical system configured to irradiate the atomic vapor within the vessel with laser radiation that, when suitably tuned, can launch atoms previously confined in each of the MOTs toward the other MOT, wherein:
there is a midpoint between the two sets of magnetic coils, and the two sets of magnetic coils are configured such that when activated, the coils produce a magnetic field that is non-zero at the midpoint.

2. The apparatus of claim 1, wherein the atomic vapor is a vapor of rubidium.

3. The apparatus of claim 1, wherein the respective coil sets are aligned with opposite polarity, resulting in the absence of a magnetic zero at the midpoint.

4. Light-pulse atomic interferometry (LPAI) apparatus, comprising a vessel, two sets of magnetic coils configured to magnetically confine an atomic vapor in two respective magneto-optical traps (MOTs) within the vessel when activated, and an optical system configured to irradiate the atomic vapor within the vessel with laser radiation that, when suitably tuned, can launch atoms previously confined in each of the MOTs toward the other MOT, wherein the MOTs are separated from each other by a distance selected to provide a time-of-flight of the launched atoms from one MOT to the other of 12 ms or less.

5. The apparatus of claim 4, wherein the atomic vapor has a vapor pressure greater than one nanotorr.

6. The apparatus of claim 4, wherein the apparatus is configured for room temperature operation.

7. The apparatus of claim 4, wherein the vessel is permanently sealed.

8. The apparatus of claim 4, wherein the optical system is configured with four distinct planes of optical access to the interior of the vessel.

9. The apparatus of claim 4, wherein the optical system is configured to illuminate the interior of the vessel with twelve laser beams, herein denominated cooling beams, for optically cooling, trapping, and launching the trapped atoms.

10. The apparatus of claim 9, wherein eight of the cooling beams are coplanar, said coplanar beams are arranged in two groups of four converging beams each, and each of said four-beam groups is arranged in two collinear pairs of beams.

11. The apparatus of claim 4, wherein the atomic vapor is a vapor of rubidium.

12. Light-pulse atomic interferometry (LPAI) apparatus, comprising a vessel, two sets of magnetic coils configured to magnetically confine an atomic vapor in two respective magneto-optical traps (MOTs) within the vessel when activated, and an optical system configured to irradiate the atomic vapor within the vessel with laser radiation that, when suitably tuned, can launch atoms previously confined in each of the MOTs toward the other MOT, wherein the MOTs are situated approximately 36 mm apart.

13. The apparatus of claim 12, wherein the atomic vapor has a vapor pressure greater than one nanotorr.

14. The apparatus of claim 13, wherein the atomic vapor has a vapor pressure of 100 nanotorr or more.

15. The apparatus of claim 12, wherein the apparatus is configured for room temperature operation.

16. The apparatus of claim 12, wherein the vessel is permanently sealed.

17. The apparatus of claim 12, wherein the optical system is configured with four distinct planes of optical access to the interior of the vessel.

18. The apparatus of claim 12, wherein the optical system is configured to illuminate the interior of the vessel with twelve laser beams, herein denominated cooling beams, for optically cooling, trapping, and launching the trapped atoms.

19. The apparatus of claim 18, wherein eight of the cooling beams are coplanar, said coplanar beams are arranged in two groups of four converging beams each, and each of said four-beam groups is arranged in two collinear pairs of beams.

20. The apparatus of claim 12, wherein the atomic vapor is a vapor of rubidium.

21. Light-pulse atomic interferometry (LPAI) apparatus, comprising a vessel, two sets of magnetic coils configured to magnetically confine an atomic vapor in two respective magneto-optical traps (MOTs) within the vessel when activated, and an optical system configured to irradiate the atomic vapor within the vessel with laser radiation that, when suitably tuned, can launch atoms previously confined in each of the MOTs toward the other MOT, wherein:

the apparatus is configured to activate the magnetic coils according to a magnetic field gradient profile;

according to said profile the magnetic field is switched off at a time t0 and switched back on to produce an initial high value of a gradient of the magnetic field at a time t3;

further according to said profile, the magnetic field gradient is ramped down from its initial high level at the time t3 to a lower steady-state level at a subsequent time t4, while from t3 to t4 atoms released from one MOT are being recaptured by the other MOT.

22. The apparatus of claim 21, wherein the atomic vapor is a vapor of rubidium.

* * * * *